United States Patent [19]

Kapadia et al.

[11] Patent Number: 5,028,205
[45] Date of Patent: Jul. 2, 1991

[54] OIL SCAVENGER SYSTEM FOR A SEAL FOR A ROTARY SHAFT

[75] Inventors: Neville D. Kapadia, Bombay, India; Thomas E. Vincent, Charlotte; Larry K. Taylor, Mooresville, both of N.C.

[73] Assignee: Ingersoll-Rand Company, Woodcliff Lake, N.J.

[21] Appl. No.: 450,477

[22] Filed: Dec. 14, 1989

[51] Int. Cl.$^5$ .................. F01D 11/00; F01D 25/00
[52] U.S. Cl. ..................... 415/112; 415/230; 277/24; 277/72 R
[58] Field of Search ............ 415/110, 111, 112, 229, 415/230, 170.1; 277/16, 24 X, 72 R X, 81 R

[56] References Cited

U.S. PATENT DOCUMENTS

| | | | |
|---|---|---|---|
| 3,926,442 | 12/1975 | Muller | 277/3 |
| 3,927,889 | 12/1975 | Adams, Jr. et al. | 277/25 |
| 4,152,092 | 5/1979 | Swearingen | 415/53 R |
| 4,153,141 | 5/1979 | Methlie | 184/6.2 |
| 4,230,324 | 10/1980 | Derman | 415/110 |
| 4,245,844 | 1/1981 | Pohl et al. | 277/3 |
| 4,300,772 | 11/1981 | Nissel | 277/3 |
| 4,386,780 | 6/1983 | Dernedde | 277/24 |
| 4,475,735 | 10/1984 | Smuda et al. | 277/3 |
| 4,475,736 | 10/1984 | Lesiecki | 277/3 |
| 4,496,032 | 1/1985 | Sommer | 188/180 |
| 4,574,926 | 3/1986 | Bubak | 192/18 A |
| 4,579,350 | 4/1986 | Knox | 277/24 |
| 4,613,140 | 9/1986 | Knox | 277/24 |
| 4,657,495 | 4/1987 | Sakamaki et al. | 418/82 |
| 4,749,283 | 6/1988 | Yokomatsu et al. | 384/12 |

FOREIGN PATENT DOCUMENTS

| | | | |
|---|---|---|---|
| 0665106 | 5/1989 | U.S.S.R. | 415/112 |
| 8604655 | 8/1986 | World Int. Prop. O. | 415/111 |

Primary Examiner—Edward K. Look
Assistant Examiner—Hoang Nguyen
Attorney, Agent, or Firm—Glenn B. Foster

[57] ABSTRACT

An oil scavenger system for a face seal including a lubricant scavenger system for retrieving lubricant which has escaped from a first side to a second side of a seal which seals a rotary shaft. The rotary shaft is used on a compressor, pump, or any other machine which involves a lubricant seal about a rotary shaft. A cover encases the second side of the seal, producing a first space therebetween. A first pressure is maintained in the first space. A second space is interconnected to the first space whereby the lubricant may freely pass therebetween. The interconnection may be mounted exterior or interior of the machine. A second pressure is maintained in the second space than in said first space. The second space may actually be in communication with the first side of the seal. The second pressure is less than the first pressure.

8 Claims, 2 Drawing Sheets

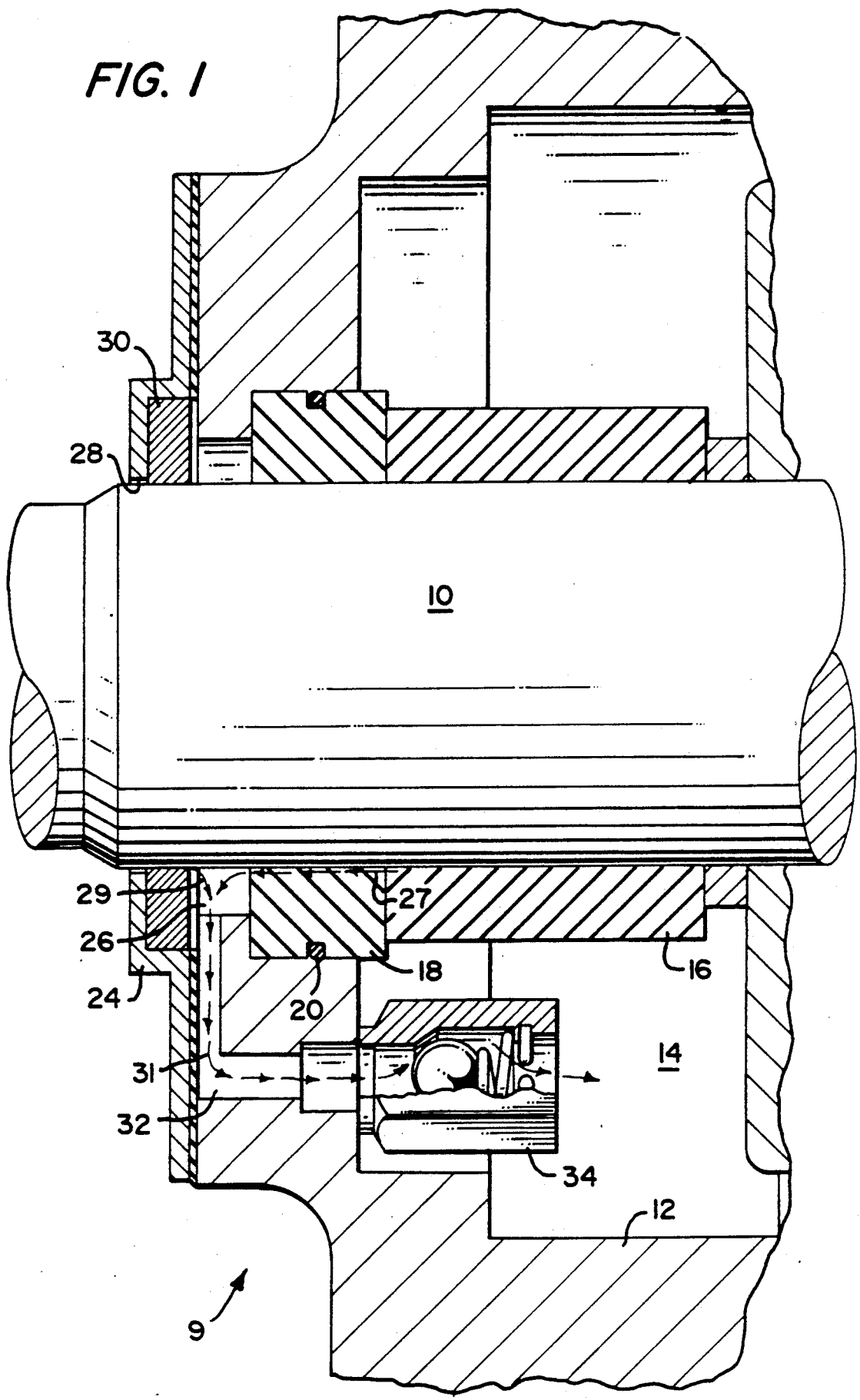

OIL SCAVENGER SYSTEM FOR A SEAL FOR A ROTARY SHAFT

BACKGROUND OF THE INVENTION

This invention relates generally to seal for a rotating shaft, and more particularly to a scavenger system which captures oil which has flowed through a face seal for a rotating shaft.

BACKGROUND DESCRIPTION

Up to now, oil which has escaped past the face seal of a compressor, pump, or any other machine with a rotating shaft, leaked to the floor creating a mess. Dirt often adhered to the leaked oil producing an unsightly mess on and around the machines.

The forgoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a fluid scavenger system comprising a housing having an internal space for containing a lubricating fluid within the internal space. A rotary shaft is in communication with the internal space and is rotatably supported within the housing. Rotary shaft seal means are mounted between the housing and the rotary shaft for restricting passage of fluid from the internal space between the rotary shaft and the rotary shaft seal. A first space is defined by the housing, the rotary shaft seal and the rotary shaft, the first space having a first pressure. Scavenger means interconnect the first space with a portion of the internal space which has a lower pressure than said first pressure, for returning the fluid which has passed between the seal means and the rotary shaft into said first space back within the internal space.

The forgoing and other aspects will become apparent from the following detailed description of the invention when considered in conjunction with the accompanying drawing. It is to be expressly understood, however, that the drawing figures are not intended as a definition of the invention, but are for the purpose of illustration only.

BRIEF DESCRIPTION OF THE DRAWING

In the drawing:

FIG. 1 is a cross sectional view illustrating an embodiment of the oil scavenger system of the instant invention;

DETAILED DESCRIPTION

Figure 3:
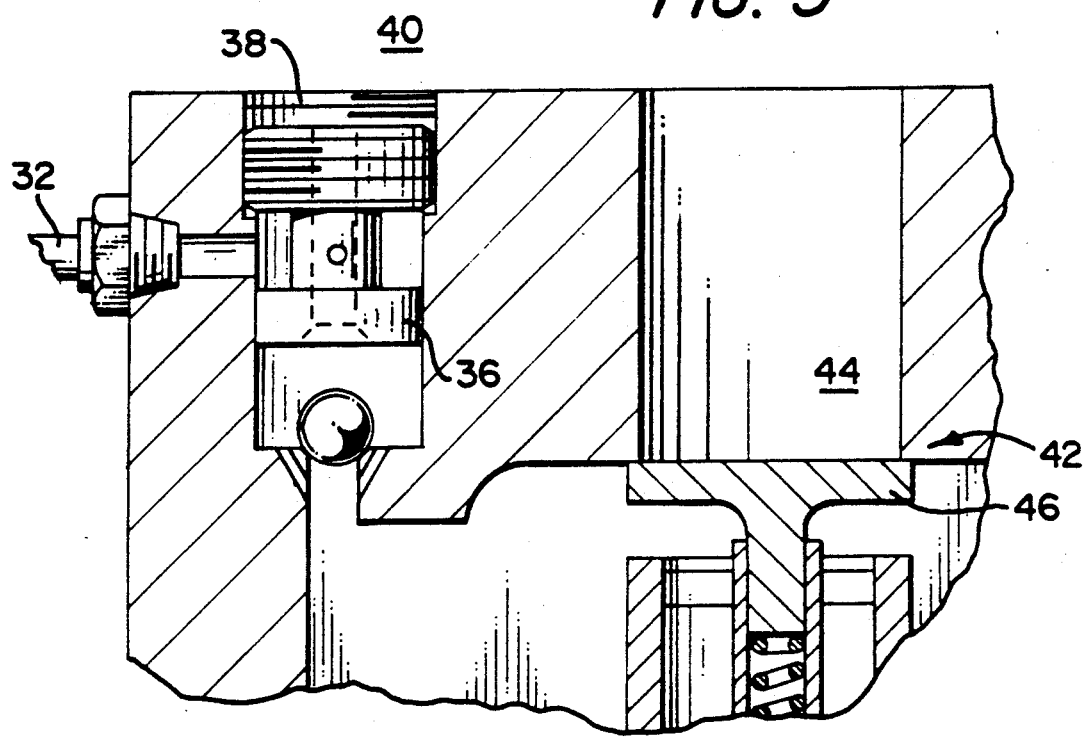
FIG. 3 is a cross sectional view illustrating a remote lubricant return portion of the oil scavenger embodiment shown in FIG. 2.

Referring now to the drawings, FIG. 1 illustrates one embodiment of the lubricant scavenger system of the instant invention. Similar elements to those existing in FIG. 1, as described in the background of the instant invention, are similarly numbered.

A rotary shaft 10 of a compressor 9 or similar machine is rotatably mounted within a housing 12. A compressor inlet area 14 is formed in the housing 12. A rotating shaft seal 16 which rotates with the shaft 10, and a stationary seal 18 which remains affixed to the housing through O-ring 20, cooperate to maintain the lubricant in the inlet 14 from passing to the atmosphere 22.

However, some lubricant does manage to seep between the stationary seal 18 and the shaft 10. The seepage increases as the condition of the seal 18 and the alignment of the shaft deteriorate, and eventually can be substantial. Any lubricant which passes through the stationary seal traditionally spreads over the remainder of the machine to the floor, collects considerable dirt, hardens, and generally creates a mess. The purpose of the instant invention is to collect the lubricant which has seeped past seal 18, and return it to the sump.

A lubricant scavenge cap 24 forms the outer face of a scavenger reservoir 26. For the scavenger to function, the pressure in reservoir 26 must be greater than the pressure where the lubricant is being returned to.

Atmospheric pressure is maintained in space 26 via vent 28. A labyrinth 30, made from felt or a similar material, prevents oil from passing through the vent 28. Air from the atmosphere passes through vent 28 and labyrinth 30 as shown by arrow 29. The oil which seeps between the seal 18 and the shaft 10 as shown by the arrows 27, combines with the air 29 to form a mixture shown by arrows 31.

When the compressor is operating, a slight pressure is formed in the inlet area 14. Therefor, any mixture 31 in the scavenger reservoir 26 recess is forced via a conduit 32 (which may be internal or partially external of the housing) and a check valve 34 into the inlet 14 by the pressure differential.

When the compressor is shutting down, a temporary supra-atmospheric pressure is formed in the inlet. The check valve 34 checks the flow of air and oil from the inlet 14 to the recess 26.

Figure 2:
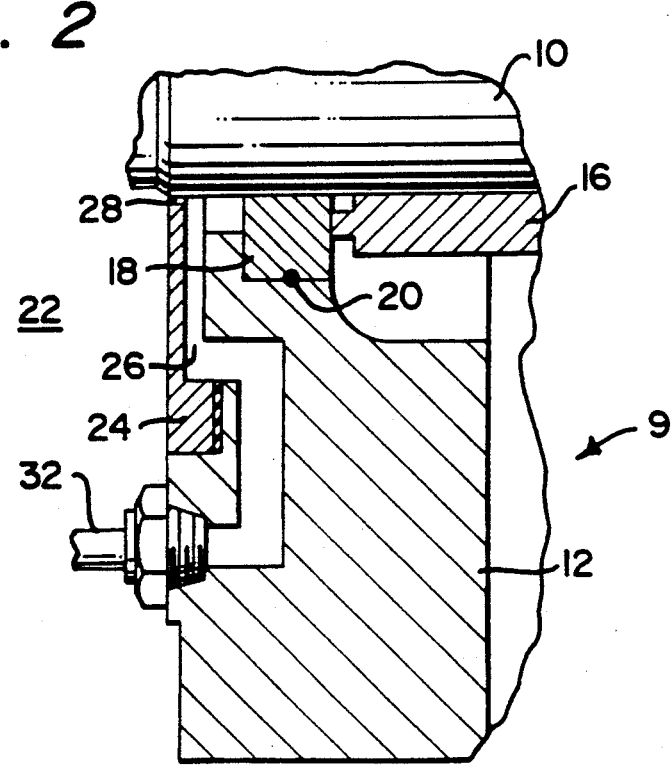
FIG. 2 is a cross sectional view illustrating another embodiment of the oil scavenger system of the instant invention.

The embodiment shown in FIGS. 2 and 3 are similar to that of FIG. 1 with the following exceptions. The vent 28 is provided to be so close fitting to make the labyrinth unnecessary to limit the mixture 31 from escaping to the atmosphere. The conduit 32 is formed partially externally of the housing 12, and is drilled perpendicular to intake valve seat 36.

A check valve 36 is formed in an intake valve seat 38, and permits air to flow downwardly, as shown in FIG. 3, into a compressor inlet area 38, but restricts upward flow to the atmosphere 40. An intake valve 42 includes a valve bore 44 and a valve seat 46.

The action of the compressor 9 and the inlet valve 42 act to produce a vacuum in the compressor inlet area 38. This vacuum acts to pull air and oil which have seeped into the scavenger recess 26 into the compressor inlet area 38.

It is to be understood that this scavenger method and apparatus can be used in any system where oil seeps through a seal surrounding a rotary shaft. The exact value of the pressures permit operation as long as the scavenger recess pressure exceeds the compressor inlet area pressure.

While this invention has been illustrated and described in accordance with a preferred embodiment, it is recognized that variations and changes may be made therein without departing from the invention as set forth in the claims.

What is claimed is:

1. A fluid scavenger system comprising:

housing means having an internal space for containing a lubricating fluid within said internal space;

a rotary shaft in communication with the internal space and rotatably supported within the housing means;

rotary shaft seal means mounted between the housing means and the rotary shaft for restricting passage of fluid from the internal space between the rotary shaft and the rotary shaft seal;

a first space defined by the housing means, the rotary shaft seal and the rotary shaft, the first space having a first pressure; and scavenger means, interconnecting the first space with a portion of the internal space which has a lower pressure than said first pressure, for returning the fluid which has passed between the seal means and the rotary shaft into said first space back within the internal space.

2. The apparatus as described in claim 1, further comprising:

check valve means for restricting fluid passage through the scavenger means from the internal space to the external space.

3. The apparatus as described in claim 2, further comprising:

a labyrinth which further defines said first space which permits air to pass between the atmosphere and said first space while restricting passage of fluid therebetween.

4. The apparatus as described in claim 3, wherein the labyrinth filters impurities from the air passing from the atmosphere to the first space.

5. The apparatus as described in claim 1, wherein the configuration of said first space prevents passage of impurities from atmosphere to said first space.

6. A fluid scavenger system comprising:

housing means having an internal space with a first pressure for containing a lubricating fluid within the said space;

a rotary shaft in communication with the internal space and is rotatably supported within the housing means;

rotary shaft seal means mounted between the housing means and the rotary shaft for restricting passage of fluid from the internal space between the rotary shaft and the rotary shaft seal;

a first space defined by the housing means, the rotary shaft seal, the rotary shaft and a labyrinth, the first space having a second pressure which is lower than said first pressure, the labyrinth permits air to pass between the atmosphere and said firs space while restricting passage of fluid therebetween; and scavenger means, interconnecting the first space with a portion of the internal space which has a lower pressure than said first pressure, for returning the fluid which has passed between the seal means and the rotary shaft into said first space back within the internal space.

7. The apparatus as described in claim 6, wherein the labyrinth filters impurities from the air passing from the atmosphere to the first space.

8. The apparatus as described in claim 6, further comprising:

a check valve means for restricting fluid passage through the scavenger means from the internal space to the external space.

* * * * *